(12) United States Patent
Kibler

(10) Patent No.: US 9,211,829 B2
(45) Date of Patent: Dec. 15, 2015

(54) LOCKING DOOR ASSEMBLY FOR DUMP TRAILER AND METHOD OF USE

(71) Applicant: MAC TRAILER MANUFACTURING, INC., Alliance, OH (US)

(72) Inventor: Scott A. Kibler, Kensington, OH (US)

(73) Assignee: MAC TRAILER MANUFACTURING, INC., Alliance, OH (US)

( * ) Notice: Subject to any disclaimer, the term of this patent is extended or adjusted under 35 U.S.C. 154(b) by 0 days.

(21) Appl. No.: 14/295,468

(22) Filed: Jun. 4, 2014

(65) Prior Publication Data

US 2014/0361597 A1   Dec. 11, 2014

Related U.S. Application Data

(60) Provisional application No. 61/833,480, filed on Jun. 11, 2013.

(51) Int. Cl.
*B60P 1/26* (2006.01)
*B60P 1/56* (2006.01)

(52) U.S. Cl.
CPC ........................................ *B60P 1/26* (2013.01)

(58) Field of Classification Search
CPC .. B62D 33/0273; B62D 61/12; B62D 25/168; B62D 33/027; B62D 33/03; B62D 33/037; B62D 61/125; B62D 63/062; B60J 7/1621; B60J 7/085; B60J 7/1614; B65F 3/001; B65F 1/02; B65F 1/004; B65F 2003/0279; B65F 3/00; B65F 3/201; B65F 3/24; B65F 3/26; B65F 1/1468; B65F 3/08; B65F 3/20; B65F 3/28
USPC ............. 49/454, 456, 464–466, 489.1, 490.1; 298/7, 23 R, 23 D, 17 R, 23 MD, 23 DF
See application file for complete search history.

(56) References Cited

U.S. PATENT DOCUMENTS

| | | | | |
|---|---|---|---|---|
| 1,948,170 | A * | 2/1934 | Forde | 298/23 R |
| 2,783,508 | A * | 3/1957 | Keating et al. | 49/466 |
| 2,943,753 | A * | 7/1960 | Keys | 414/424 |
| 3,120,408 | A * | 2/1964 | Pruss | 298/8 R |
| 3,361,476 | A * | 1/1968 | Smock | 298/7 |
| 5,197,782 | A * | 3/1993 | May et al. | 298/23 M |
| 5,575,536 | A * | 11/1996 | Wallan | 298/23 R |
| 6,582,024 | B2 * | 6/2003 | Hicks | 298/8 T |
| 8,042,875 | B2 | 10/2011 | Maiorana | |

* cited by examiner

*Primary Examiner* — Glenn Dayoan
*Assistant Examiner* — Sunsurraye Westbrook
(74) *Attorney, Agent, or Firm* — Sand & Sebolt

(57) ABSTRACT

A lockable center door assembly for a dump trailer is provided. A frame is mounted in a wall of the dump trailer and has a pair of opposite and spaced apart channels. A retractable door has a pair of edges slidably received in the frame. A pivot linkage assembly is operatively connected to the door for linearly moving the door between the closed and open positions. A locking assembly movable between an engaged position and a disengaged position is operatively connected to the pivot linkage assembly for securing the door in either the closed or open position.

24 Claims, 14 Drawing Sheets

LOCKING DOOR ASSEMBLY FOR DUMP TRAILER AND METHOD OF USE

CROSS REFERENCE TO RELATED APPLICATION

This application claims priority from U.S. Provisional Patent Application Ser. No. 61/833,480, filed Jun. 11, 2013, the disclosure of which is incorporated herein by reference.

BACKGROUND OF THE INVENTION

1. Technical Field

The present invention relates to dump trailers on trucks. More particularly the present invention relates to dump trailers which are pivotally mounted such that the front may be elevated so that a load carried in the trailer is removed by gravity through a chute located in a rear tailgate wall. Specifically, the present invention relates to a center door assembly for a dump trailer chute which includes a locking assembly configured to selectively lock a door of the assembly in each of an open position and a closed position.

2. Background Information

Many trucks have a bed, trailer, or body that is lifted upwardly relative to the vehicle to unload materials by gravity from within the bed. Dump trailers for industrial use, such as dump trucks and coal trucks, typically employ a tailgate which is pivotally mounted to the top of the side walls of the dump body and extends across the width of the bed, such that it may swing between an open and closed position as the front of the dump body varies in elevation.

These rear tailgates oftentimes include a center door assembly called a "coal chute". The coal chute is substantially narrower than the rear tailgate and includes a door that can be selectively opened or closed. Common coal chute designs involve sliding the door up and down within tracks mounted in the sidewalls of the chute. Using a pivot arm, the user draws the door upwards along the chute door track before the bed of the dump truck is lifted. As the bed is lifted, the material within the bed exits through the coal chute in a contained and controlled stream that can be fed directly onto a ditch, intake basin, or onto a conveyor belt.

An examination of the prior art reveals that general center door assemblies for dump trailers exist. U.S. Pat. No. 8,042,875 issued in the name of the same inventor as this application, James A. Maiorana, provides a retractable center door assembly for a dump trailer operable by rotating a crank arm attached to a pivot linkage assembly to move the door between a closed and open position. The '875 Patent can secure the door in an open position by turning a handle, however the door may sometimes become unlocked and slide down during unloading or may sometimes become inadvertently stuck.

Therefore, the need continues to exist in the art for an improved center door assembly for a dump trailer, the present invention addresses some of these issues.

BRIEF SUMMARY

One aspect of an embodiment of the present invention may provide a center door assembly for a dump trailer comprising: a frame adapted to be mounted in a wall of the dump trailer; a retractable door engaging the frame and movable between a closed position and an open position; a pivot linkage assembly operatively connected to the door for linearly moving said door between the closed and open positions; and a locking assembly movable between an engaged position and a disengaged position, and operatively connected to the pivot linkage assembly for selectively locking the door in each of the closed and open positions.

Another aspect of an embodiment of the present invention may provide a dump trailer apparatus comprising: a dump trailer adapted to carry bulk materials and be towed behind a towing vehicle, said trailer having at least one wall; a retractable door engaging a frame mounted to the at least one wall and movable between a closed position and an open position; a pivot linkage assembly operatively connected to the door for linearly moving said door between the closed and open positions; and a locking assembly movable between an engaged position and a disengaged position, and operatively connected to the pivot linkage assembly for selectively locking the door in each of the closed and open positions.

A further aspect of an embodiment of the present invention may provide a method for operating a center door assembly for a dump trailer comprising the steps of: providing a door assembly including a retractable door movable between a closed position and an open position, a pivot linkage assembly having a crank arm operatively connected to the door for linearly moving said door between the closed and open positions, and a locking assembly having an operatively connected handle, lock rod and locking plate that is movable between an engaged position and a disengaged position and operatively connected to the pivot linkage assembly to selectively lock the door in each of the closed and open positions; moving the handle of the locking assembly from the engaged position to the disengaged position; disengaging the lock rod from the locking plate to unlock the door; rotating an axle of the crank arm about an axis; drawing the door towards one of the open and closed position; moving the handle of the locking assembly from the disengaged position to the engaged position; and engaging the lock rod with the lock plate to lock the door in the one of the open and closed positions.

BRIEF DESCRIPTION OF THE SEVERAL VIEWS OF THE DRAWINGS

A preferred embodiment of the invention, illustrative of a best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION

Figure 1:
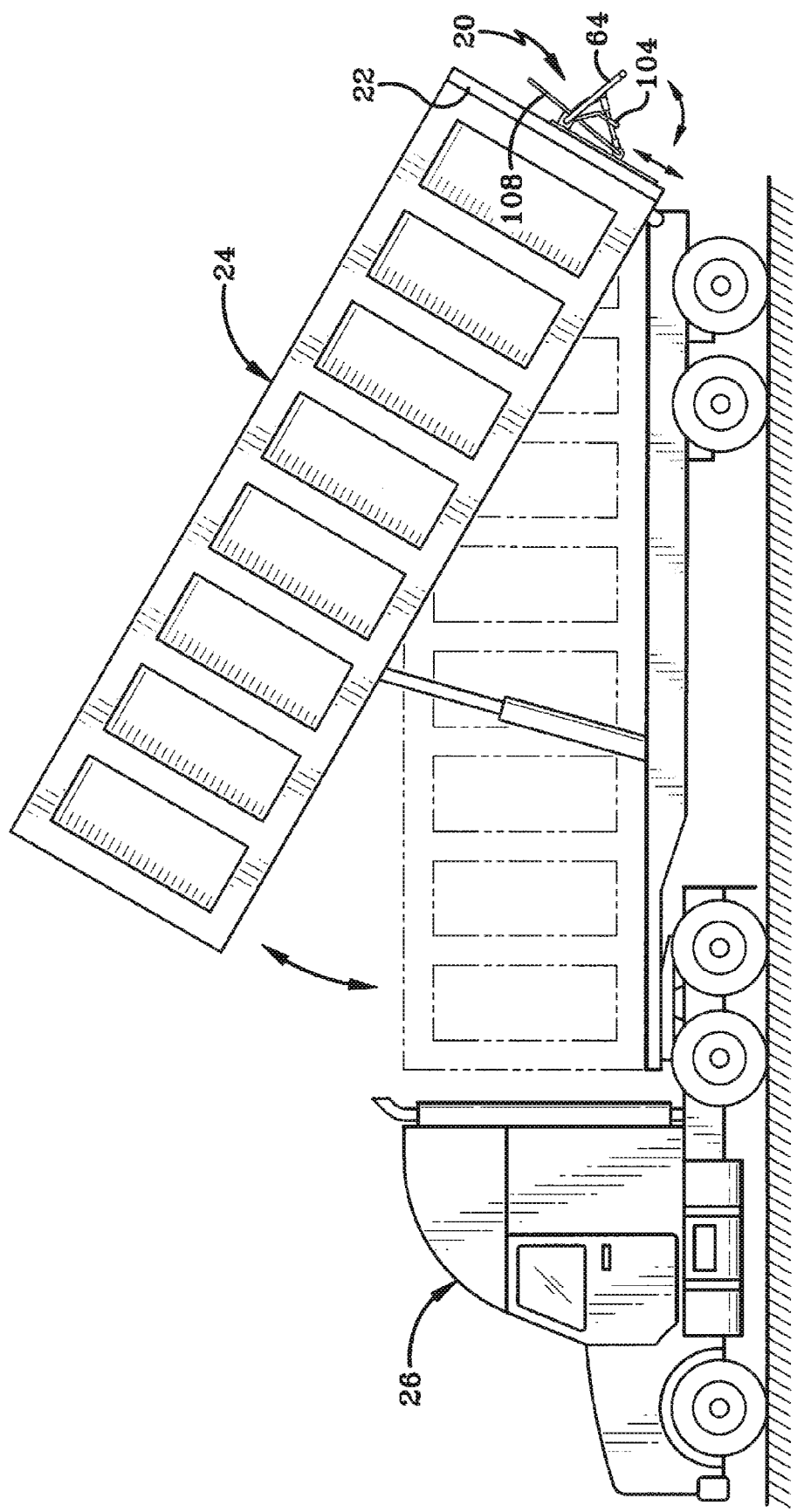
FIG. 1 is a schematic view of a vehicle towing a dump trailer with a center door assembly of the present invention located in a rear tailgate wall.
Figure 2:
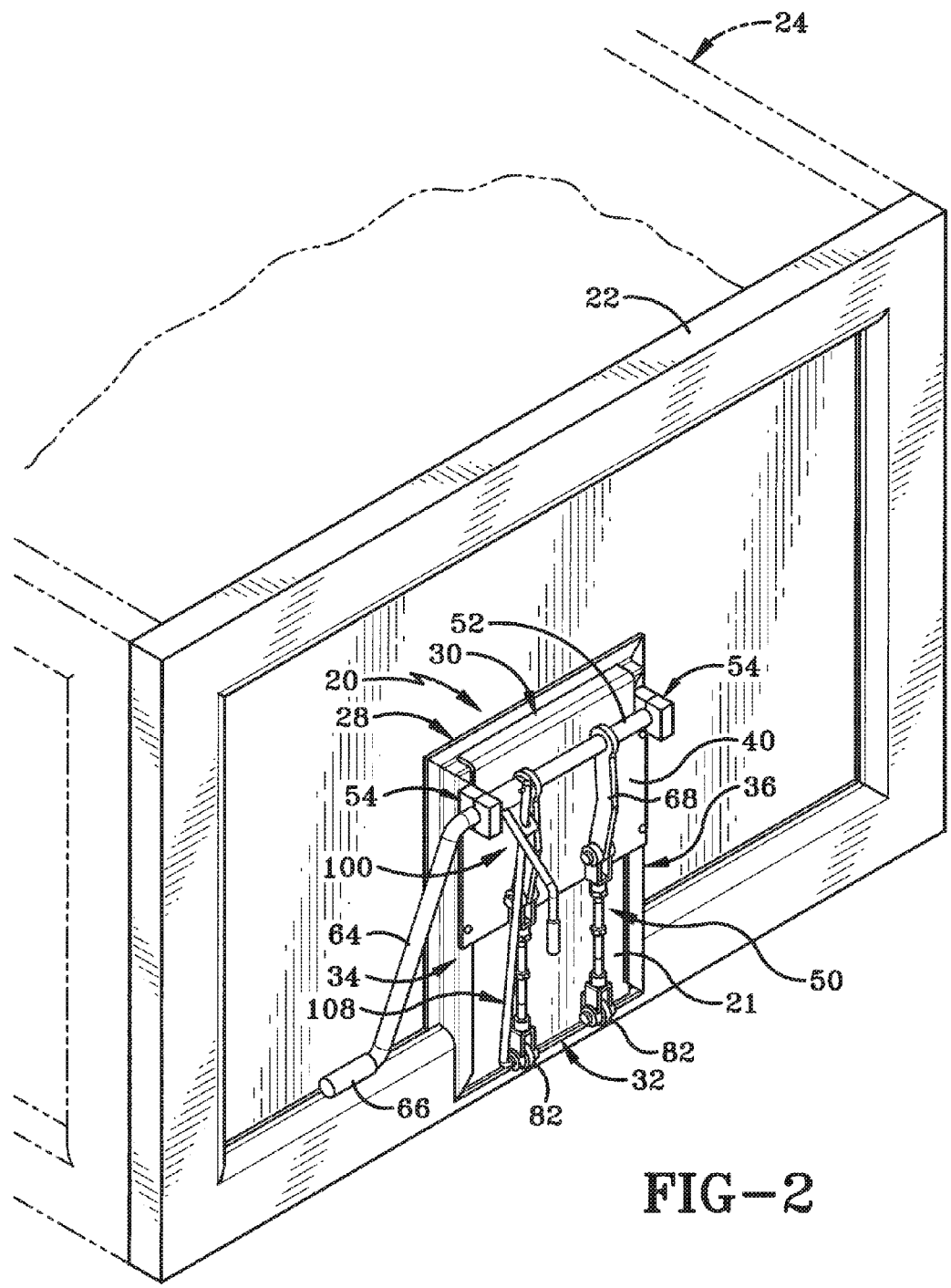
FIG. 2 is a perspective view of the center door assembly located in a rear tailgate wall.

A center door assembly is generally indicated as 20, and is shown in FIGS. 1-13. Center door assembly 20 is typically disposed in a rear tailgate wall 22 of a dump trailer 24 of a vehicle 26 as shown in FIGS. 1 and 2.

Figure 3:
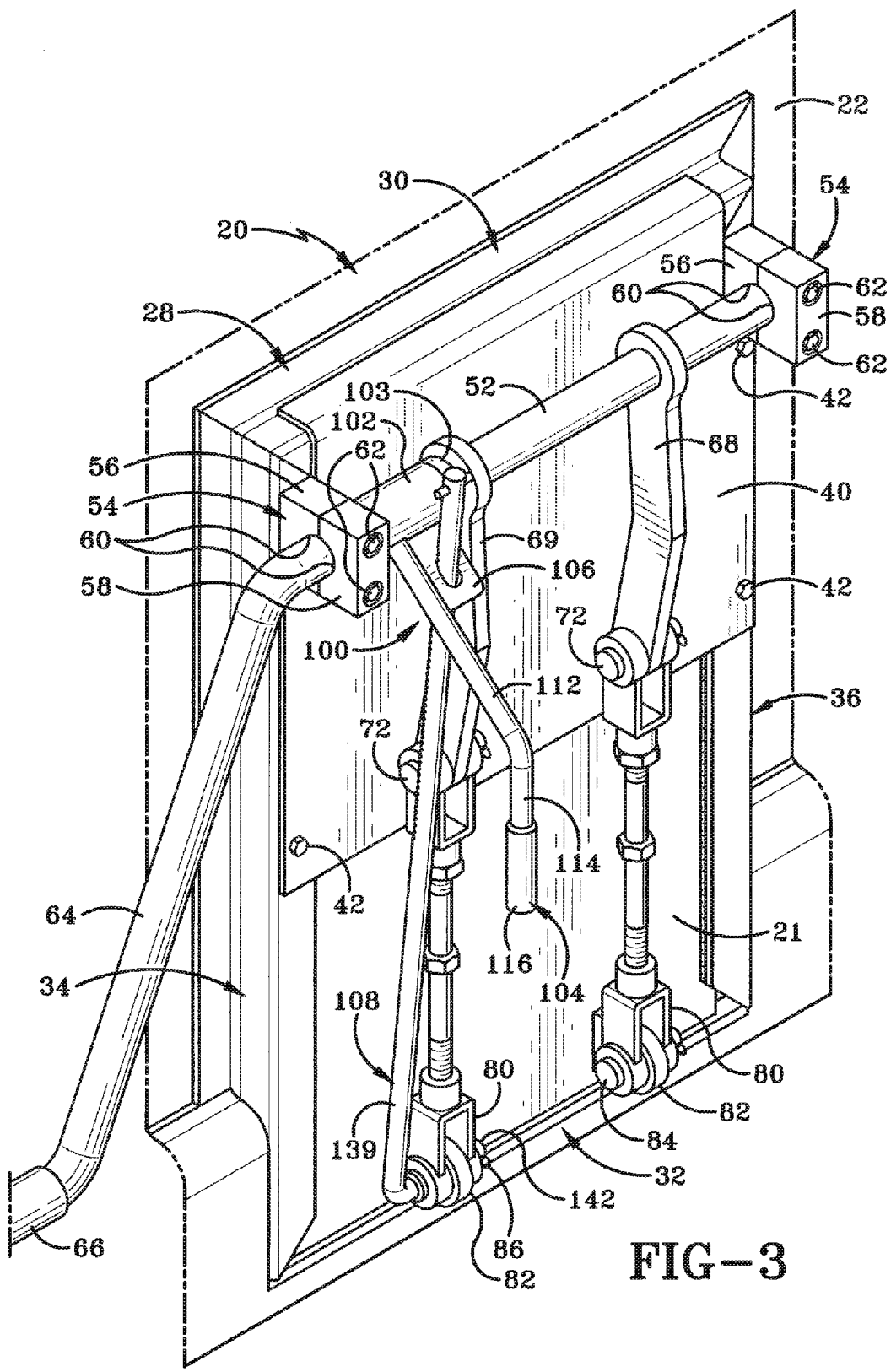
FIG. 3 is an enlarged perspective view of the center door assembly depicting a close position.
Figure 4:
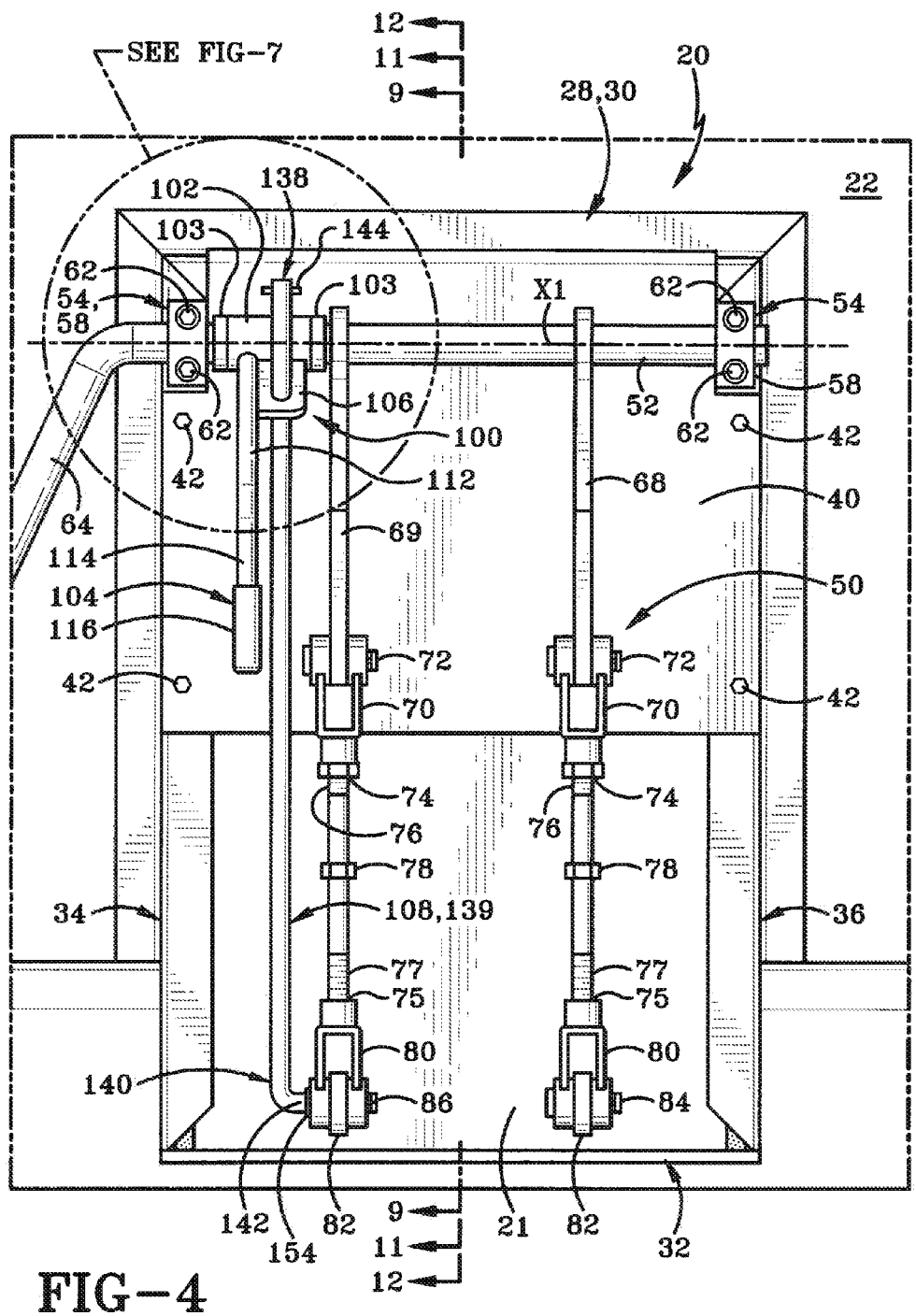
FIG. 4 is a front elevation view of the center door assembly.
Figure 5:
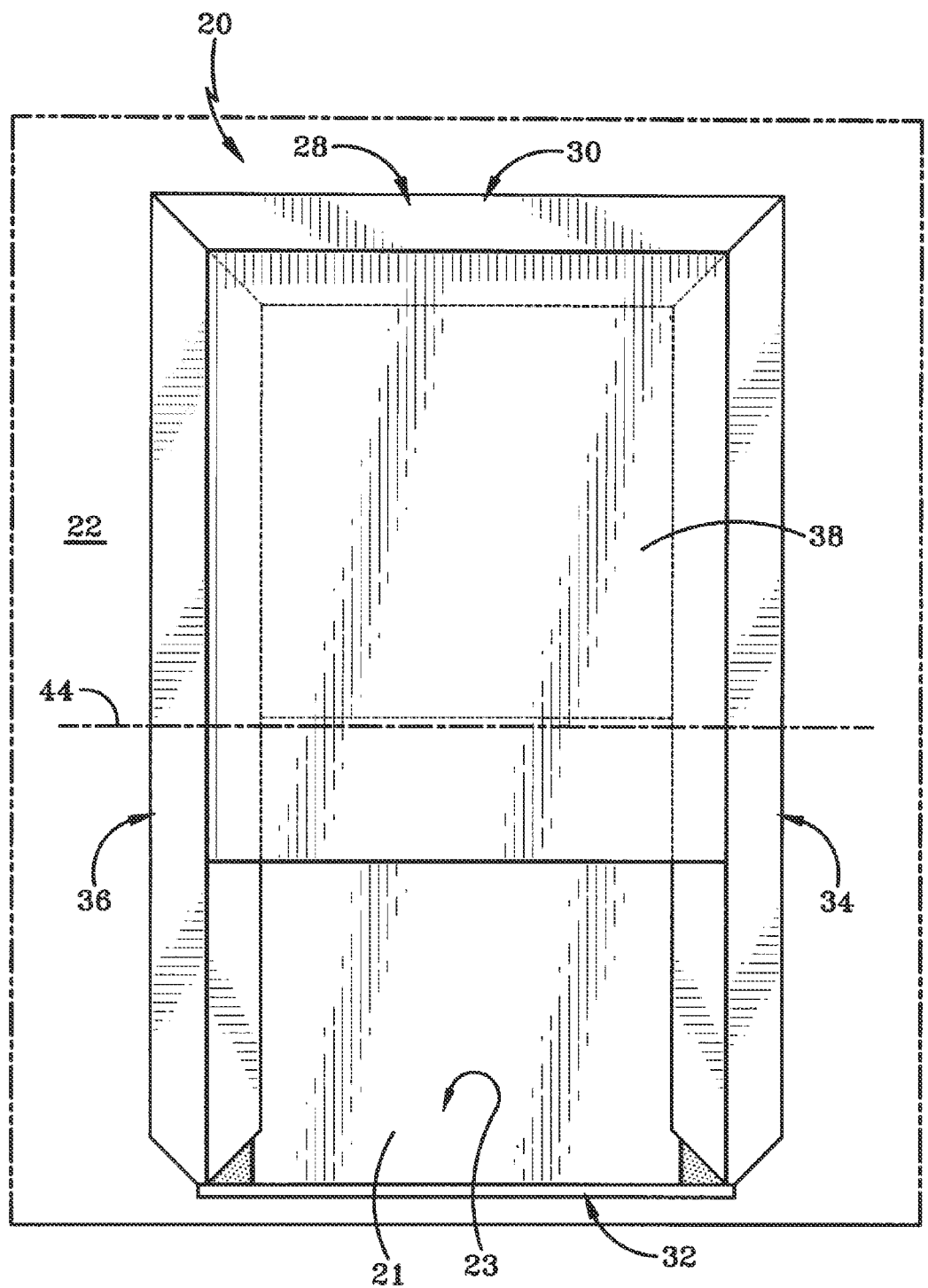
FIG. 5 is a rear elevation view of the center door assembly viewed from inside the dump trailer depicting the door in its closed position.

Referring to FIG. 3-5, door assembly 20 includes a door 21 supported by a rectangular frame 28 having top and bottom ends 30 and 32 respectively, first and second sides 34 and 36 respectively, an inner cover plate 38 (FIG. 5) secured to frame 28 by a weld, and an outer cover plate 40 externally secured to frame 28 with a plurality of bolts 42 or other type of fasteners. Outer cover plate 40 extends in a spaced parallel relationship with respect to inner cover plate 38 (FIG. 5). Outer cover plate 40 extends from top end 30 of frame 28 to the general longitudinal midpoint of frame 28, indicated by dot dash line 44 in FIG. 5. Inner cover plate 38 (FIG. 5) is generally longer and extends past line 44. Frame 28 includes a U-shaped channel (unnumbered, FIG. 12) extending around the periphery of frame 28, and is shaped to receive tailgate wall 22 for securing center door assembly 20 to dump trailer 24. A door opening 23 (FIG. 5) is defined by the frame 28 and the inner plate 38. Door 21 is positioned to cover the opening 23 and configured to travel through the spaced formed by the parallel relationship of the inner and outer plates 38, 40.

Referring generally to FIGS. 3-5, and shown particularly in FIGS. 6-13, a pivot linkage assembly indicated generally at 50 is removably secured to frame 28. Pivot linkage 50 includes an axle 52 secured at each end by a pillow block bearing 54. Each block bearing 54 extends outwardly from frame 28 and comprises a first and second block 56 and 58 each having a half-moon recess 60. First block 56 is welded to frame 28 proximate top end 30 and includes a pair of threaded receiving holes (not shown). Second block 58 is removably secured to first block 56 by means of a pair of threaded bolts 62 extending through holes (not shown) formed in second block 58 and into threaded receiving holes in first block 56. Pivot linkage 50 further comprises of a crank arm 64 integral to axle 52. Crank arm 64 extends from axle 52 and terminates in a crank handle 66 sized to be manipulated by a user's hand.

A pair of lift arms 68 and 69, respectively, extends from and are fixedly attached, preferably by a weld, to axle 52 intermediate pillow block bearings 54. Each lift arm 68, 69 is pivotally connected to a U-shaped bracket 70 by a pivot shaft 72, each bracket 70 forming a bottom threaded hole 74 for receiving a first end 76 of a threaded stud bolt 78 therein. Bolt 78 extends to second threaded end 77 which is received in a threaded receiving hole 75 of a second U-shaped bracket 80. Each bracket 80 is pivotably attached to lobe 82. The bracket 80 operatively connected to the first lift arm 68 is secured to lobe 82 by a smooth pivot shaft 84. The bracket 80 operatively connected to the second lift arm 69 is secured to lobe 82 by a foot member 142 having a cotter pin 86 attached. Each lobe 82 is connected to door 21 adjacent bottom end 32.

Figure 6:
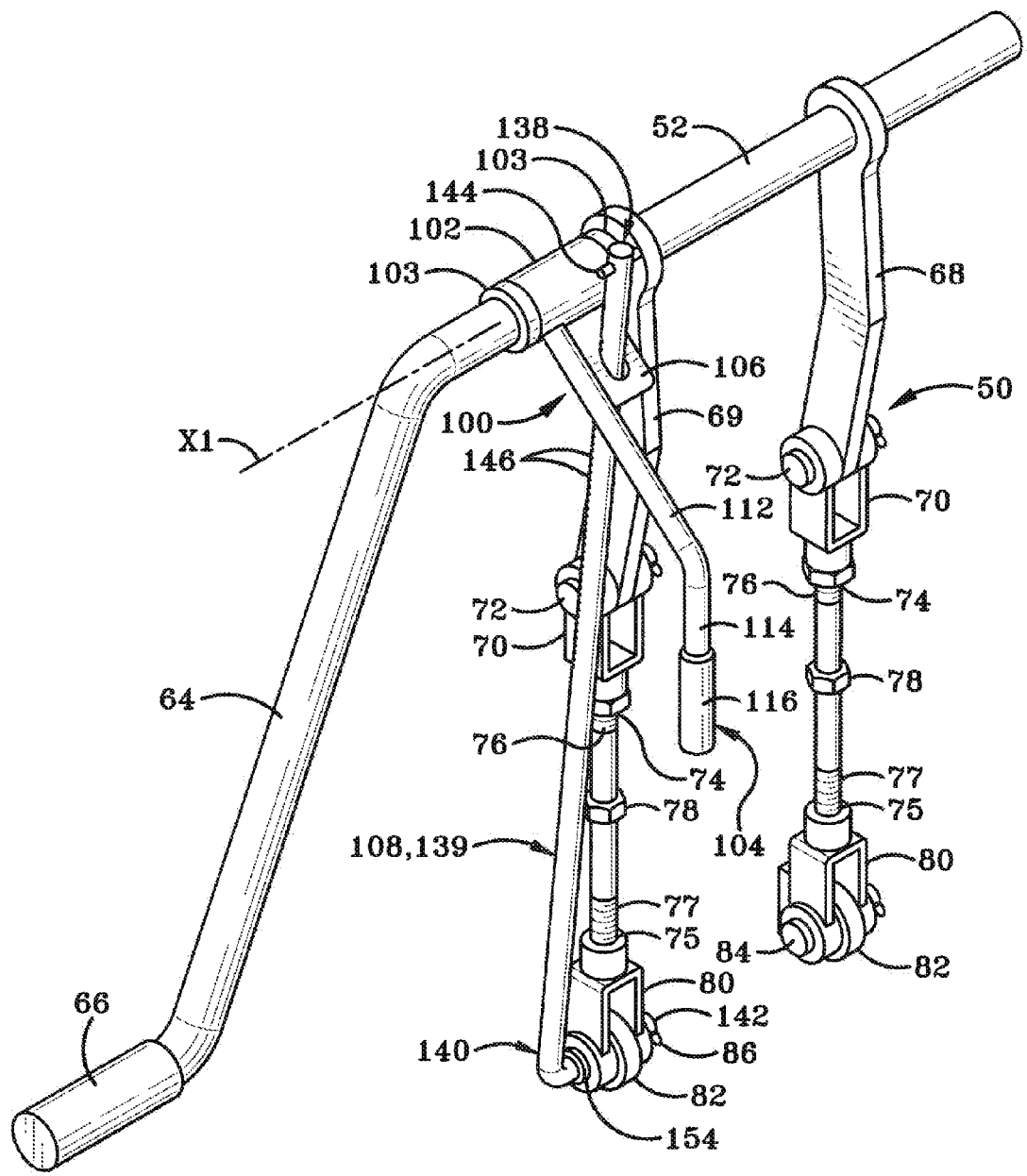
FIG. 6 is a detailed perspective view of the pivot linkage assembly and the lock assembly connected to the crank arm and axle with the center door and frame not shown.
Figure 6A:
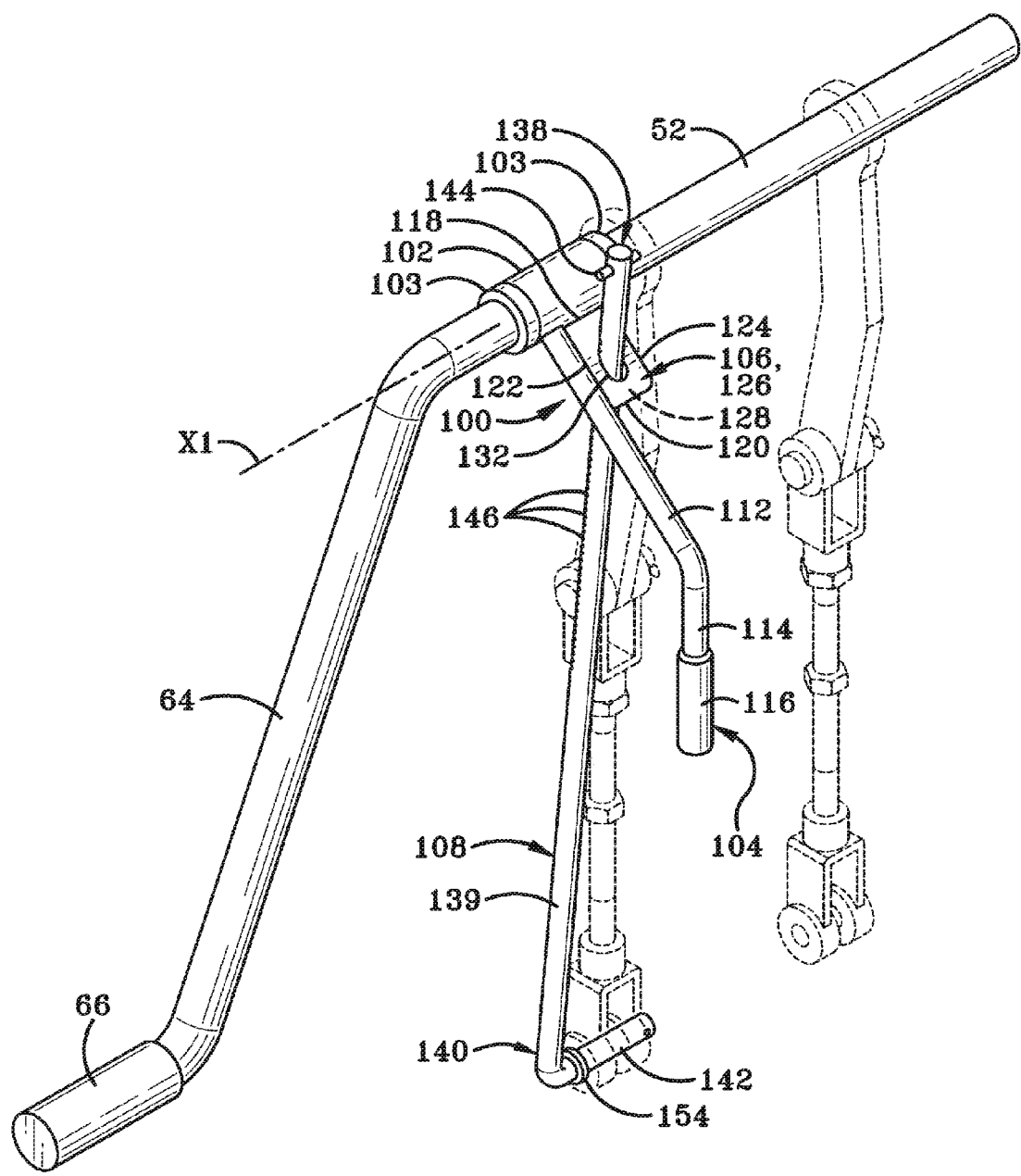
FIG. 6A is a detailed perspective view of the lock assembly connected to the crank arm and axle with the pivot linkage assembly shown in dot-dash.
Figure 7:
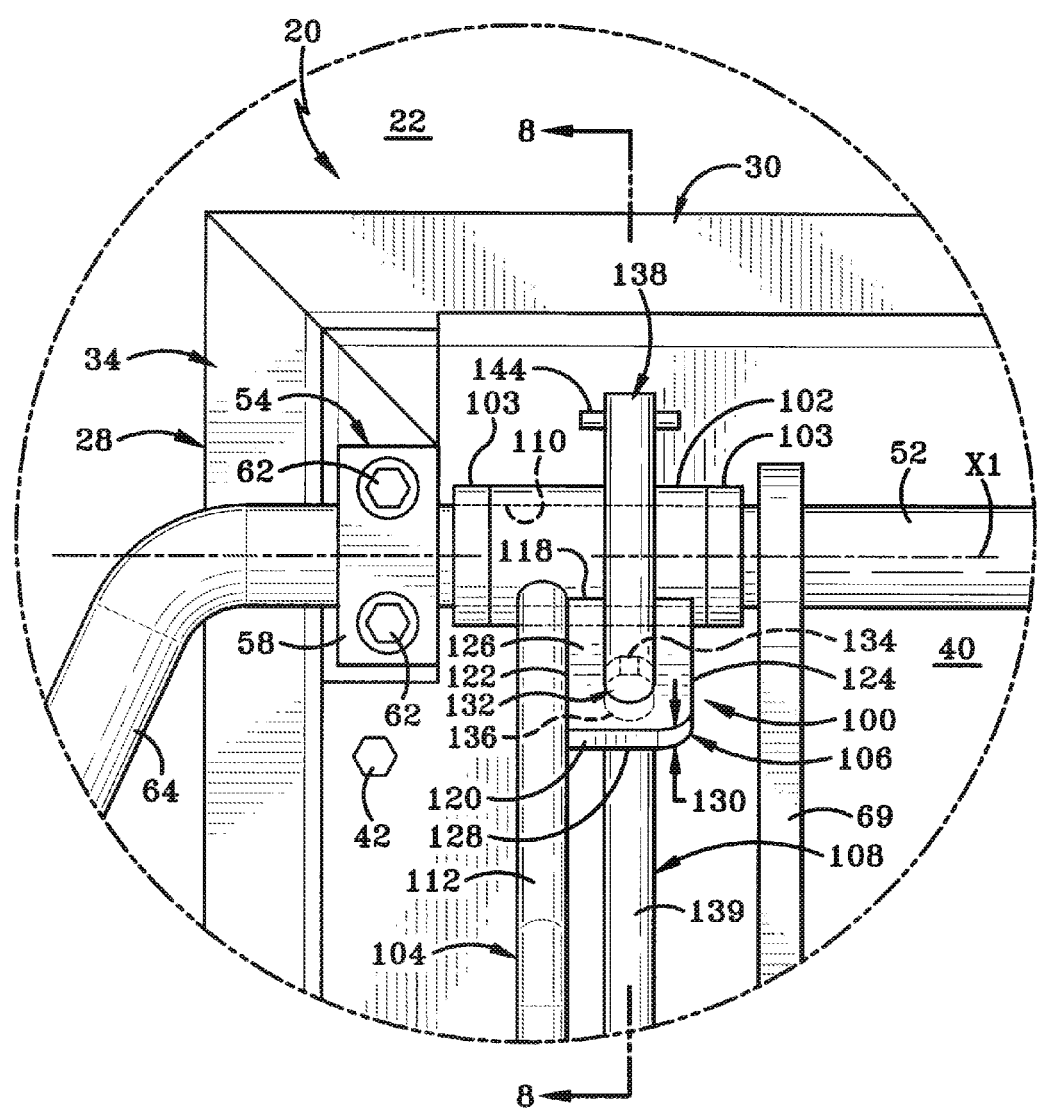
FIG. 7 is an enlarged frontal elevation of the linkage assembly taken from the cutout section identified in FIG. 4.
Figure 8:
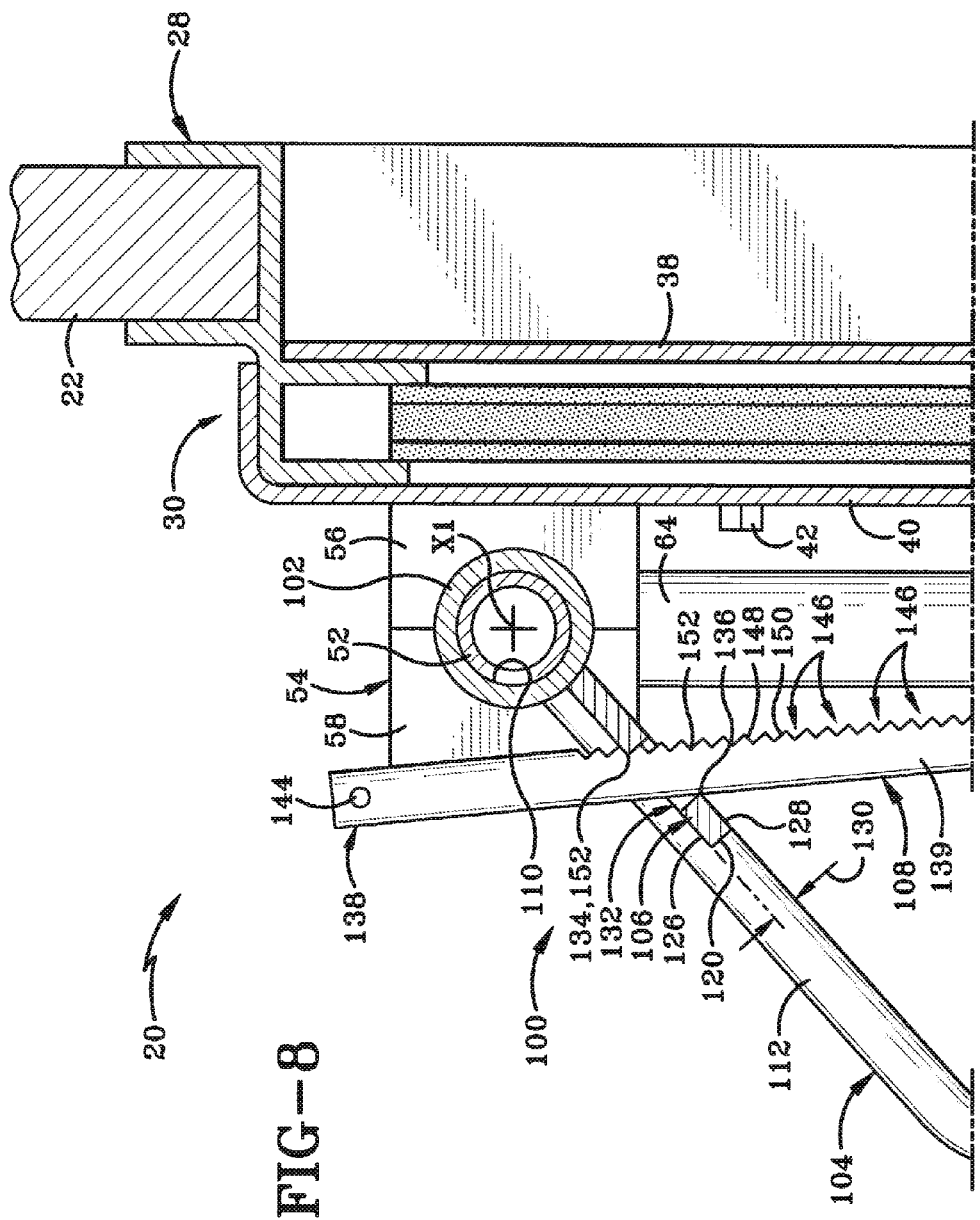
FIG. 8 is a cross section view taken along line 8-8 of FIG. 7 depicting the locking assembly in an engaged position.

As see in FIG. 6A, a friction lock assembly 100 comprises an axle collar 102, a handle 104, a locking plate 106, and the lock rod 108. Axle collar 102 is generally tubular having an outer diameter and an inner diameter defining a collar thickness therebetween. A collar lumen 110 is defined by the tubular collar. Collar lumen 110 (FIG. 7-8) is configured to slidably engage or otherwise receive axle 52. Axle 52 is not secured to the inner surface of the collar 102. The unsecured relationship between the collar 102 and the axle 52 permit collar 102 and axle 52 to rotate separately about the same axis X1. Collar 102 is bound on both sides by retaining collars 103. As shown in FIG. 7, two retaining collars 103 are fixedly attached to axle 52 to bound lateral movement of slidably engaged collar 102.

Figure 10:
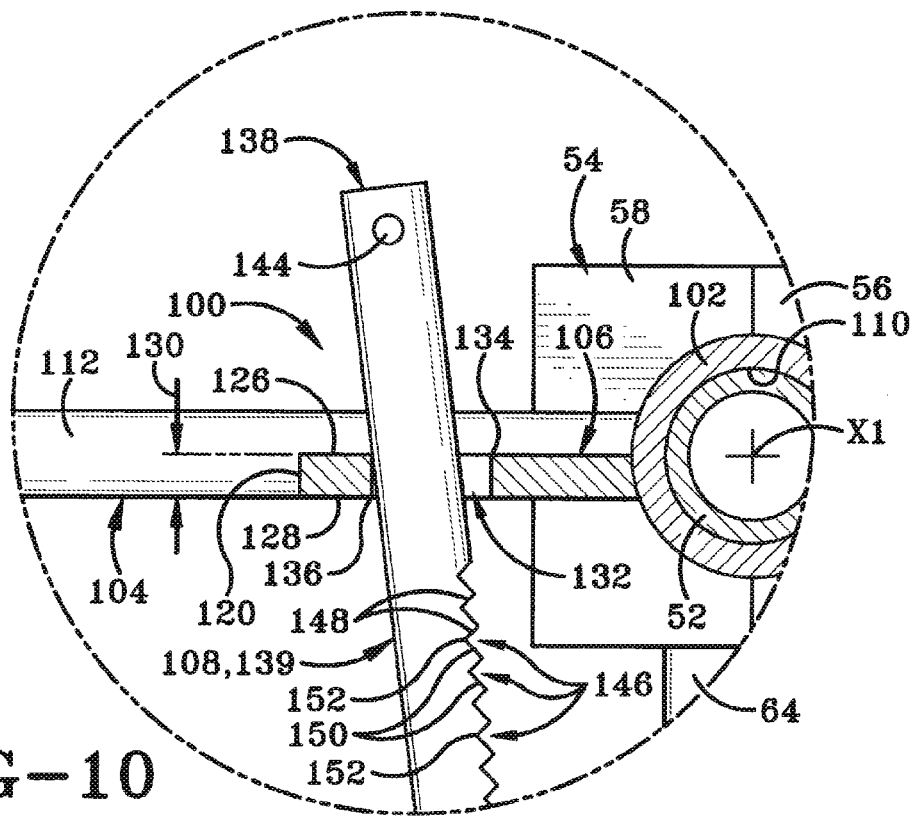
FIG. 10 is an enlarged section view taken from the cutout section identified in FIG. 9 depicting the locking assembly in the disengaged position.
Figure 13:
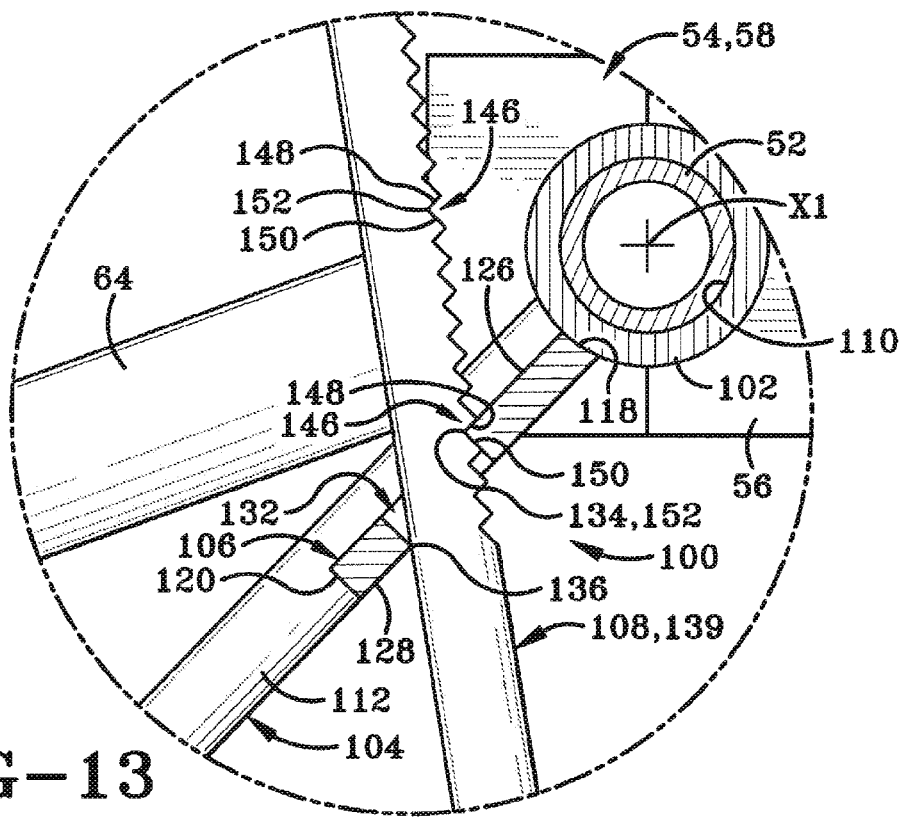
FIG. 13 is an enlarged section view taken from the cutout section identified in FIG. 12 depicting the locking assembly in the engaged position.
Figure 11:
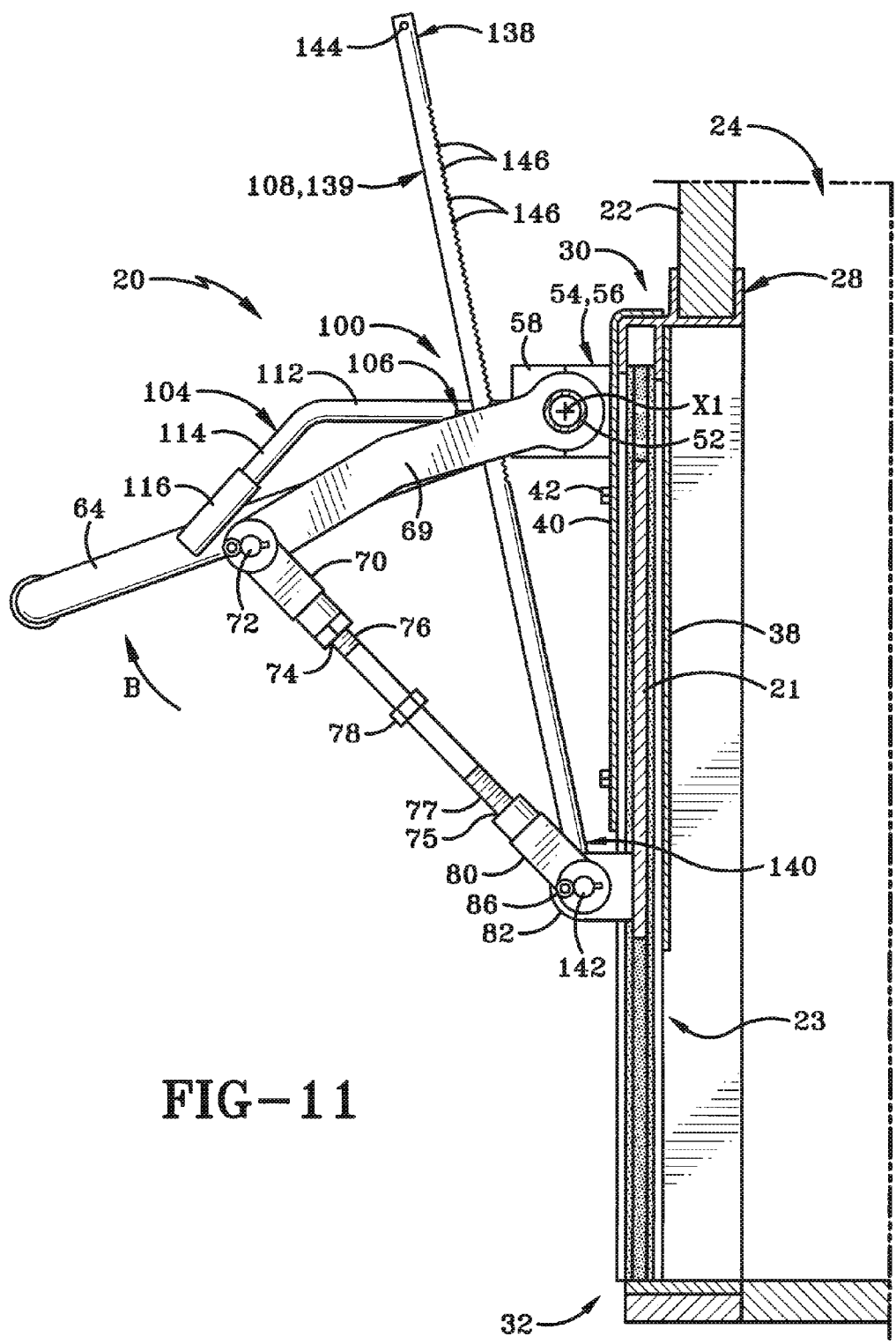
FIG. 11 is a right side cross section view taken along line 11-11 of FIG. 4 depicting the locking assembly in the disengaged position so the crank arm may be moved to draw the pivot linkage assembly in a manner that moves the door to an open position.
Figure 12:
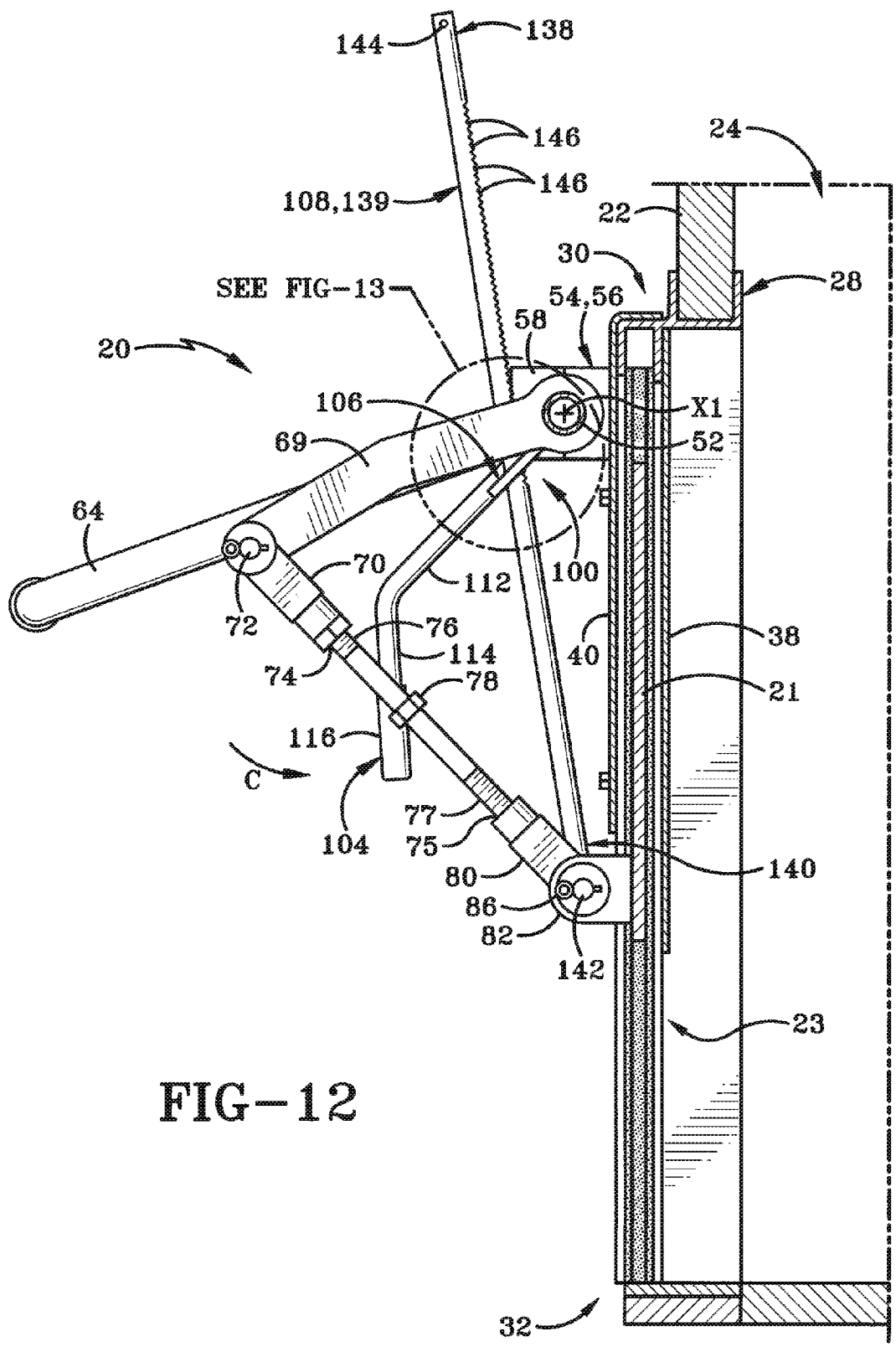
FIG. 12 is a right side cross section view taken along line 12-12 of FIG. 4 depicting the locking assembly moved to the engaged position so after the crank arm has been moved to lock the door in the open position.

Handle 104 extends outward in a linear manner from the collar 102. Handle 104 comprises a first elongated member 112, a second elongated member 114, and a grip 116. First elongated member 112 attaches to the outer surface of collar 102. Preferably, first elongated member 112 attaches adjacent one end of the collar 102, however, other attachment locations are contemplated. The fixed connection permits collar 102 and handle 104 to rotate in unison about axis X1, independent of axle 52. First elongated member 112 is generally cylindrical having first and second ends. First elongated member 112 attaches to collar at its first end and extends outward from collar to the second end. Second elongated member 114 has first end and second ends, is and generally cylindrical having a diameter similar to the first elongated member 112. First end of second elongated member 114 connects to the second end of the first elongated member 112 in an angled relationship forming handle angle α. Angle α is greater than about 90 degrees and less than about 180 degrees. In a preferred embodiment, handle angle α is approximately 120 degrees to approximately 155 degrees. When the friction lock assembly 100 is in an engaged or locked position, as seen in FIG. 13, second elongated member 114 of the handle 104 is oriented generally vertical. When friction lock assembly 100 is in a disengaged or unlocked position, as seen in FIG. 10, second elongated member 114 of handle 104 is oriented non-vertically. The grip 116 is a generally cylindrical covering defining an open end and configured to slidably engage the second elongated member 114. Grip 116 extends at least partially from second end of second elongated member 114 towards the first end of the second elongated member 114.

Locking plate 106 comprises a first edge 118 spaced apart and opposite a second edge 120, a third edge 122 spaced apart and opposite a fourth edge 124, wherein the first and second edges 118, 120 intersect the third and fourth edges 122, 124. The intersected edges are all connected. The plate further comprises a top surface 126 and a bottom surface 128 bound by the edges, wherein the top surface 126 is spaced apart and opposed the bottom surface 128 defining a plate width 130. First edge 118 is fixedly connected to the collar 102 and third edge 122 is fixedly connected to the first elongated member 112 permitting locking plate 106 to rotate in unison with the handle 104 and collar 102 as a user selectively manipulates the assembly 100. A locking aperture 132 is formed within the center of the plate bound by a top continuous annular edge 134 spaced apart and aligned with a continuous bottom annular edge 136. Preferably, locking aperture 132 is generally oval shaped. Locking aperture 132 is configured to receive the lock rod 108 between an engaged position, as seen in FIG. 13, and a disengaged position, as seen in FIG. 10.

Lock rod 108 is generally cylindrical and preferably solid. The lock rod 108 comprises a generally elongated member or rod 139 having a first end 138 and a second end 140, and an integrally formed and generally cylindrical foot member 142 extending in a generally perpendicular manner from adjacent the second end 140 of the elongated member 139. Lock rod 108 has a retaining mechanism 144, such as a cotter pin, disposed adjacent the first end 138. When pin 144 is inserted through rod 139, pin 144 prevents the locking plate 106 from being vertically over-raised and disconnecting from the lock rod 108. Alternatively, pin 144 may be integrally formed with first end 138 or is welded or otherwise secured to first end 138. Lock rod 108 has a plurality of notches or teeth 146 extending at least partially along the outer surface of the rod 139. Preferably, notches 146 extend vertically from first end 138 towards second end 140. The outer surface of elongated member 139 not containing or free of any notches 146 is unconsidered an un-notched surface. When the locking assembly 100 is in its engaged position, notches 146 are configured to engage the top annular edge 134 of the locking plate 106, while the un-notched surface engages bottom annular edge 136. The notches 146 comprise a first or horizontal section surface 148 and a second or angled section surface 150 connected at a notch edge 152. The horizontal section 148 provides an overhang that extends a distance to catch or otherwise engage the locking plate 106 at either or both of the top annular edge 134 and bottom annular edge 136 engages the notch edge 152. When the locking assembly is in the disengaged position, as shown in FIG. 10, elongated member 139 freely passes through the locking aperture 132 without touching either of the top annular edge 134 or bottom annular edge 136.

Foot member 142 has first and second ends, wherein in the first end is integral to the rod 139 and the second end forms an aperture that receives cotter pin 86 extending through foot member 142. Foot member 142 further comprises an annular retaining member 154 located adjacent the first end of the foot member and extending outward from the surface of the foot member 142. Foot member 142 extends through a foot aperture defined by lobe 82 and is secured by the cotter pin 86. Annular retaining member 154 prevents foot member 142 from over-extending through the foot aperture.

The friction lock assembly 100 is operatively connected to the door 21. When the friction lock assembly 100 is in the engaged position, the assembly enables a user to lock the door 21 at a desired position to control the flow of contents exiting the opening. When the lock assembly 100 is in the disengaged position, a user selectively operates the flow door 21 and moves it to a desired position by manipulating crank arm 64.

Pivot linkage assembly 50 allows the user to slidably move door 21 between open and closed positions. As shown in FIGS. 3 and 4, axle 52 extends between pillow block bearings 54 which allow axle 52 to rotate within half moon recess 60 of each bearing 54. Crank arm 64 is secured to one end of axle 52 and rotates axle 52 when crank arm 64 is moved by a user. The rotation of axle 52 about axis X1 rotates lift arms 68, 69 which are secured to axle 52 at one end. At the opposite end, lift arms 68, 69 are engaged with first U-shaped bracket 70 which rotates about smooth pivot shaft 72. First U-shaped bracket 70 extends to receive threaded stud bolt 78 which extends to be received by second U-shaped bracket 80. Second U-shaped bracket 80 is pivotally engaged with lobe 82 about a removable smooth pivot shaft 84 or foot member 142.

To move chute closure door 21 from a closed to an open position, the user rotates crank arm 64 causing axle 52 to rotate. Axle 52 raises lift arms 68, 69 which pivot about smooth pivot shaft 72, pulling first U-shaped bracket 70, stud bolt 78 and second U-shaped bracket 80 in an upward direction. The movement of these elements within pivot linkage assembly 50 results in an upward force on lobes 82 which transfers the force to door 21, drawing door 21 upwards.

Figure 9:
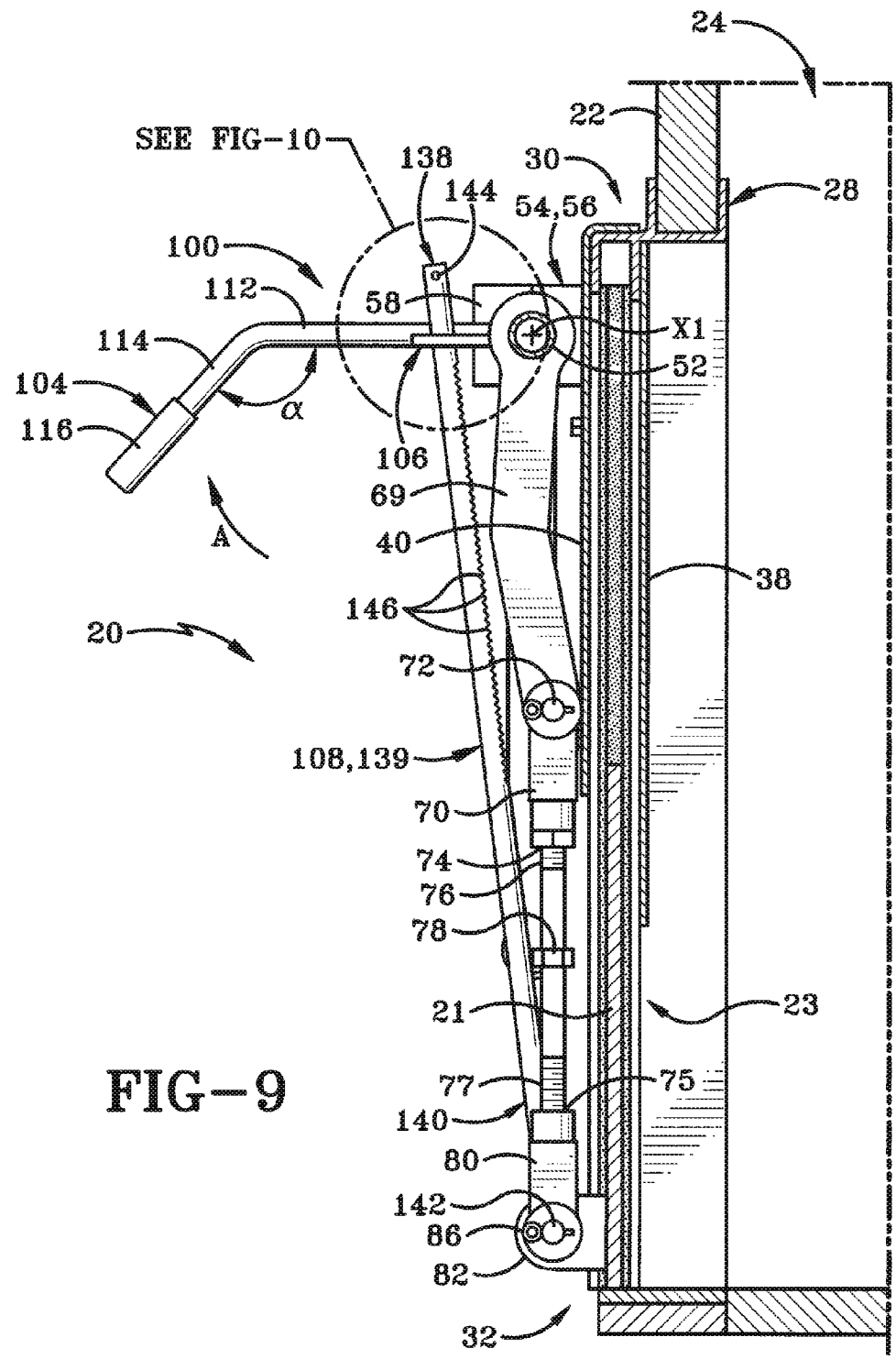
FIG. 9 is a cross section view taken along line 9-9 of FIG. 4 showing the handle of the locking assembly being raised to disengage the locking plate.

In operation, as shown in FIG. 1, center door assembly 20 is located in tailgate wall 22 of dump trailer 24 on truck 26. Door 21 is illustrated as being initially in the closed position (FIG. 2) for the purposes of this description only. A material load (not shown) such as stones, sand, mulch, or any other matter which is typically transported by truck 26 within a dump trailer, is loaded into dump trailer 24. Truck 26 moves material to the desired material deposit location and positions tailgate wall 22 to release material in the desired location. User stands behind dump trailer 24 facing the outer side of tailgate wall 22. Preferably, user grasps grip 116 of handle 104 with their right hand and crank handle 66 of crank arm 64 with their left hand. User moves handle 104 in the direction of Arrow A to move lock assembly 100 from an engaged position into a disengaged position, as shown in FIG. 9. This unlocks chute closure door 21 so that it is free to slide in the frame. While the door 21 is unlocked and therefore free to be moved, it is still in the closed position. The user then rotatably moves crank handle 66 upwards in the direction of Arrow B (FIG. 11) which causes door 21 to slidably move from a closed position (FIG. 2) to an open position. This lifting motion causes axle 52 to rotate about its axis X1 in a first direction. Since first and second lift arms 68, 69 are engaged with axle 52 and are secured (such as by welding) to a lower end of door 21, as axle 52 rotates, door 21 is raised within frame 28 from the closed position to the open position. As door 21 is raised to the open position, lock rod 108, which is operatively engaged with lobes 82 which in turn are secured to door 21, is cause to travels upwards through aperture 132. Lock rod 108 is only free to travel in this manner as it was disengaged from lock plate 106 when lock assembly 100 was moved from the engaged position to the disengaged position.

When door 21 is in the open position, the user will once again move lock assembly 100 from the disengaged position to the engaged position so as to lock door 21 in the open position. The locking of the door 21 in the open position ensures that door 21 will not accidentally drop back into the closed position when the load is being dumped through opening 23. In order to engage locking assembly 100 (FIG. 12), the user moves handle 104 in the direction of Arrow C. This movement causes the handle 104, lock plate 106 and collar 102 to rotate about the axle's axis X1 in the direction of Arrow C. This rotational motion is independent of any rotation in the axle. Rotation of lock plate 106 causes the relative orientation between lock plate 106 and elongated member 139 to change and lock plate 106 engages lock rod 108. In particular, first annular edge 134 of lock plate 106 engages a notch 146 on a region of rod 139. Additionally, second annular edge 136 of lock plate 106 engages an un-notched or smooth region of rod 139. Lock rod 139 is thereby constrained from moving relative to lock plate. Thus, door 21 is locked in the open position.

Dump trailer 24 then is moved from a generally horizontal position to an angled position with respect to the ground, as seen in FIG. 1. This allows the gravitational force to pull material towards tailgate wall 22 within dump trailer 24. Material is dumped out of dump trailer 24 through the opening 23 defined by frame 28 and a bottom edge of the open door 21 in tailgate wall 22. After the desired amount of material is dumped, dump trailer 24 is returned to the horizontal position. User unlocks door 21 by disengaging locking assembly 100 by reversing the steps previously described herein and then using pivot linkage assembly 50 moves the door 21 from the open position to the closed position by reversing the steps previously described herein. Lock rod 108 travels downward through aperture 132 as door 21 is lowered into the closed position. When door 21 is once again in the closed position, lock assembly 100 is moved from the disengaged position to the engaged position so that door 21 is once again locked. The dump trailer may then be moved to another location without risk of the door 21 accidentally sliding upwardly within frame 28 and allowing any material remaining in the trailer to drop through opening 23.

Figure 14:
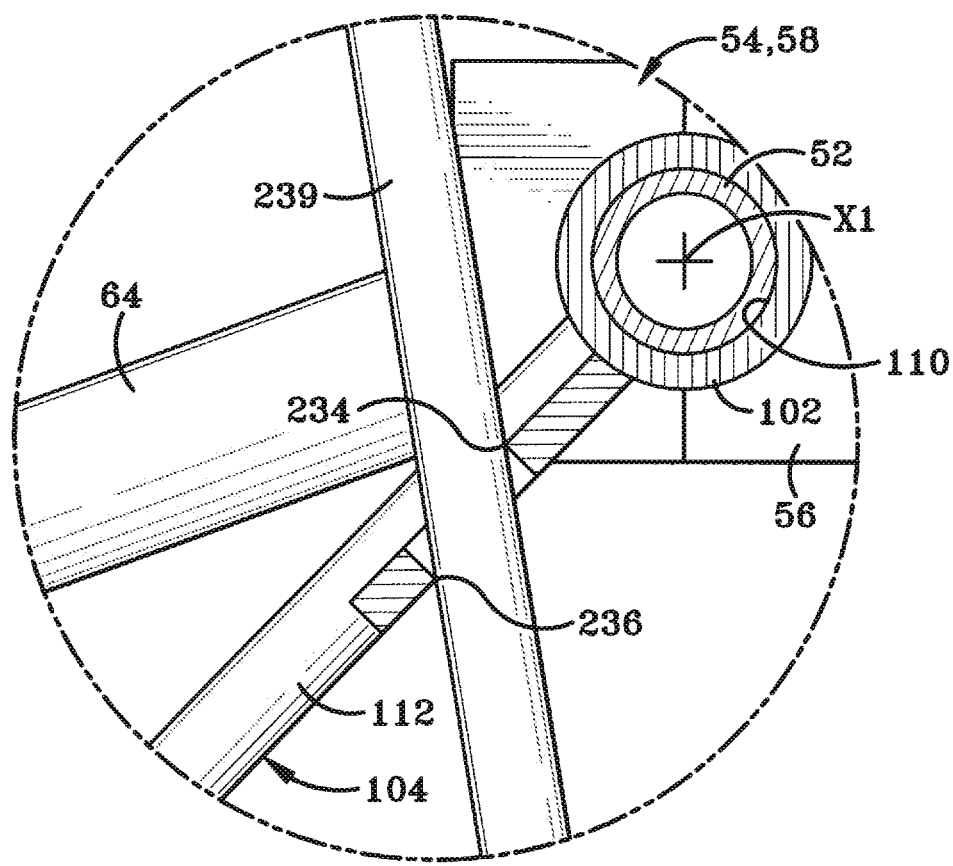
FIG. 14 is an enlarged section view of an alternative embodiment of the locking assembly having a smooth shaft lock rod in the engaged position.

As seen FIG. 14, an alternate embodiment of the lock assembly provides a rod 239 having a completely un-notched or smooth surface. The smooth surfaced rod 239 frictionally engages either or both of the top annular edge 234 and bottom annular edge 236 of the locking plate when the locking assembly 100 is in its engaged position.

The method may further include dumping a load of material carried by the dump trailer through an opening defined by a bottom edge of the door and a frame in which the door is mounted when the door is in the open position; and elevating a front end of the dump trailer in order to move the load of material toward a wall in which the frame and door are mounted.

Still further, the step of moving the handle may include rotating the handle about the axis of the axle; rotating a collar which is secured to the handle about the axle's axis; and rotating the locking plate secured to the collar and handle about the axle's axis. Particularly, the step of moving the handle includes rotating the handle, collar and locking plate in unison about the axle's axis.

Furthermore, the method may include sliding the lock rod through the lock aperture in the lock plate when the lock rod is disengaged from the lock plate; and engaging the lock rod with a portion of the lock plate which defines the lock aperture when the lock rod is engaged with the lock plate. The step of engaging the lock rod with the portion of the lock plate may include engaging a notch on the lock rod with a first annular edge of the portion of the lock plate which defines the lock aperture; and frictionally engaging an un-notched or substantially smooth region of the lock rod with a second annular edge of the portion of the lock plate which defines the lock aperture. Alternatively, the step of engaging the lock rod with the portion of the lock plate may include frictionally engaging regions of an outer surface of the lock rod with a first annular edge and a second annular edge of the portion of the lock plate which defines the lock aperture.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A center door assembly for a dump trailer comprising:
a frame adapted to be mounted in a wall of the dump trailer;
a sliding retractable door engaging the frame and vertically movable between a closed position and an open position; wherein the retractable door includes a bottom edge at a first height in the closed position and the bottom edge at a second height in the open position, wherein the second height is above the first height;
a manually operable pivot linkage assembly operatively connected to the door for manually moving said door vertically between the closed and open positions; and
a locking assembly movable between an engaged position and a disengaged position, and operatively connected to the pivot linkage assembly for selectively locking the door in each of the closed and open positions, wherein the engaged position of the locking assembly locks the retractable door in a vertical alignment; and wherein the retractable door remains in vertical alignment when the locking assembly is in the disengaged position.

2. The center door assembly of claim 1, wherein the locking assembly comprises:
a rotatable locking plate operatively connected with the pivot linkage assembly;
a lock aperture defined in the locking plate; and
a lock rod extending through the lock aperture in each of the engaged and disengaged position, wherein said rod is operatively connected to the door and moves independently from the locking plate.

3. The center door assembly of claim 2, wherein the pivot linkage assembly includes an axle above the bottom edge of the retractable door and operatively connected to the frame; and said axle is configured to rotate about an axis; and
wherein the locking assembly further includes a collar at a height above the bottom edge of the retractable door which is operatively connected to the locking plate and is independently rotatable about the same axis as the axle.

4. The center door assembly of claim 3, wherein the locking assembly further comprises a handle fixedly connected directly to the collar, said handle being operable to rotate the collar; and wherein the handle and collar rotate in unison about the same axis as the axle.

5. The center door assembly of claim 3, wherein the locking plate is fixedly connected to the collar, and the handle, wherein the collar, the handle, and locking plate rotate in unison about the same axis as the axle.

6. The center door assembly of claim 5, wherein the handle extending outward from the collar comprises:
a first elongated member having a vertically aligned long axis extending between first and second ends; and
a second elongated member rigidly connected directly to the second end of first elongated member.

7. The center door assembly of claim 6, wherein a handle angle is formed between the first elongated member and the second elongated member, and the handle angle is in a range from about 120 degrees to about 155 degrees.

8. The center door assembly of claim 3, wherein the collar includes an inner surface defining a lumen concentrically receiving the axle therethrough, wherein the inner surface is unsecured to the axle and has a diameter larger than an outer diameter of the axle.

9. The center door assembly of claim 2, wherein the locking aperture of the moveable locking plate is bounded by:
a first annular edge located on an upwardly facing first surface of the locking plate; and
a second annular edge located on a downwardly facing second surface of the locking plate, wherein the first and second annular edges are spaced apart and aligned with each other.

10. The center door assembly of claim 2, wherein the lock aperture is generally oval.

11. The center door assembly of claim 2, wherein the lock rod comprises:

an elongated member having a vertically aligned long axis extending between first and second ends and an outer surface; and a foot member extending outwardly from adjacent the second end of the elongated member, said foot member attached to the pivot linkage assembly.

12. The center door assembly of claim 11, wherein the lock rod further includes:

a plurality of notches provided on a portion of the outer surface of the elongated member.

13. The center door assembly of claim 12, wherein each notch of the plurality of notches includes:

a first section surface on each notch;

a second section surface on each notch connected to the first section surface, thereby forming a notch edge; and wherein the notch edge is configured to engage a first annular edge defining the lock aperture, and;

wherein a second annular edge defining the lock aperture frictionally engages a region of the outer surface of the lock rod opposing the notches.

14. The center door assembly of claim 2, wherein an outer surface of the lock rod is generally smooth and configured to frictionally engage one or both of a top annular edge and a bottom annular edge defining the lock aperture in the moveable lock plate.

15. The center door assembly of claim 2, wherein the lock rod further includes a pin adjacent an upper end in the lock rod to prevent the locking plate from being over-raised and disconnecting from the lock rod.

16. A dump trailer apparatus comprising:

a dump trailer adapted to carry bulk materials and be towed behind a towing vehicle, said trailer having at least one wall;

a slidably retractable door engaging a frame mounted to the at least one wall, said door sliding vertically between a closed position and an open position;

a pivot linkage assembly operatively connected to the door for linearly moving said door between the closed and open positions; and a locking assembly movable between an engaged position and a disengaged position, said locking assembly being operatively connected to the pivot linkage assembly for selectively locking the door in each of the closed and open positions, wherein the engaged position of the locking assembly locks the retractable door in a vertical alignment.

17. A method for operating a center door assembly for a dump trailer comprising the steps of:

providing a door assembly including a vertically retractable door movable between a closed position and an open position, a pivot linkage assembly having a crank arm operatively connected to the door for vertically sliding said door between the closed and open positions, and a locking assembly having an operatively connected handle, lock rod and locking plate that is rotatable between an engaged position and a disengaged position, said locking assembly being operatively connected to the pivot linkage assembly to selectively lock the door in each of the closed and open positions, wherein the engaged position of the locking assembly locks the retractable door in a vertical alignment;

rotating the handle of the locking assembly from the engaged position to the disengaged position;

disengaging the lock rod from the locking plate to unlock the door;

rotating an axle of the crank arm about an axis;

drawing the door linearly towards one of the open and closed position, wherein a bottom edge on the door is at a first location in the open position above a second location in the closed position;

moving the handle of the locking assembly from the disengaged position to the engaged position; and engaging the lock rod with the lock plate to lock the door in the one of the open and closed positions.

18. The method of claim 17 further comprising the step of:

dumping a load of material carried by the dump trailer through an opening defined by a bottom edge of the door and a frame in which the door is mounted when the door is locked in the open position.

19. The method of claim 18, further comprising the step of:

elevating a front end of the dump trailer in order to move the load of material toward a wall in which the frame and door are mounted.

20. The method of claim 19, wherein the step of moving the handle includes the steps of:

rotating the handle about the same axis of the axle;

rotating a collar which is secured to the handle about the same xis as the axle; and rotating the locking plate secured to the collar and handle about the same axis as the axle.

21. The method of claim 20, wherein the step of moving the handle includes rotating the handle, collar and locking plate in unison about the same axis as the axle.

22. The method of claim 17, further comprising the step of:

sliding the lock rod through the lock aperture in the lock plate when the lock rod is disengaged from the lock plate; and engaging the lock rod with a portion of the lock plate which defines the lock aperture when the lock rod is engaged with the lock plate.

23. The method of claim 22, further comprising the steps of:

engaging a notch on the lock rod with a first annular edge of the portion of the lock plate which defines the lock aperture; and frictionally engaging an un-notched region of the lock rod with a second annular edge of the portion of the lock plate which defines the lock aperture.

24. The method of claim 23, further comprising the step of:

frictionally engaging regions of an outer surface of the lock rod with a first annular edge and a second annular edge of the portion of the lock plate which defines the lock aperture.

* * * * *